Sept. 8, 1959     N. P. WORDEN     2,903,570
LAMP ASSEMBLY
Filed Aug. 27, 1954
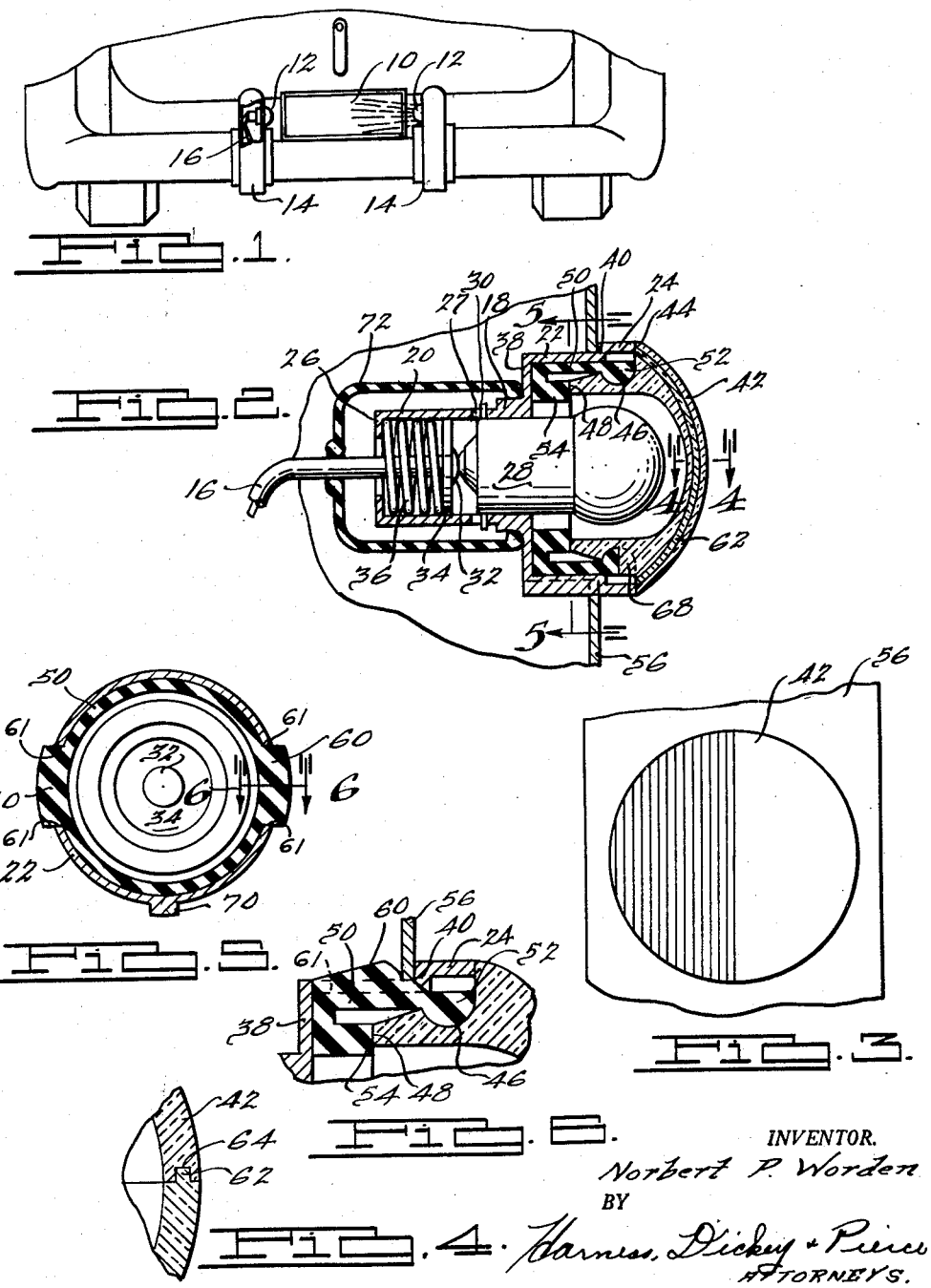
INVENTOR.
Norbert P. Worden
BY
Harness, Dickey & Pierce
ATTORNEYS.

United States Patent Office 2,903,570
Patented Sept. 8, 1959

2,903,570
LAMP ASSEMBLY

Norbert P. Worden, Detroit, Mich., assignor to C. M. Hall Lamp Co., Detroit, Mich., a corporation of Michigan Application August 27, 1954, Serial No. 452,587

7 Claims. (Cl. 240—7.1)

This invention relates to demountable assemblies and more particularly to demountable lamp assemblies.

The object of this invention is to improve, simplify, reduce the cost of manufacture, and facilitate the replacement of lamp assemblies.

A feature of this invention is a lamp assembly particularly adapted for mounting in an apertured plate.

Another feature of this invention is a sealed lamp unit adapted for use in vehicular bodies.

Another feature of this invention is a lamp assembly including two lens portions, preferably of different colors or of different degrees of transparency, interlocked to produce an integral structure.

Another feature of this invention is a flexible grommet adapted not only to interassociate a lamp lens portion and a lamp body portion, but also to serve as a means for attaching the lamp assembly to an apertured mounting plate.

The manner of accomplishing the foregoing objects and features, and further objects and features will become apparent from consideration of the following detailed description of one embodiment of the invention when read with reference to the accompanying drawing in which:

Figure 1 is a rear view of an automobile showing paired elements accepting the lamp assemblies constituting an embodiment of the invention, with one of those paired elements being partially cut away more clearly to show the lamp assembly;

Fig. 2 is an elevational view taken in section of the complete lamp assembly which constitutes the disclosed embodiment of the invention;

Fig. 3 is a front elevational view of the lamp assembly shown in Fig. 2;

Fig. 4 is a sectional view taken substantially along the line 4—4 of Fig. 2;

Fig. 5 is a sectional view taken substantially along the line 5—5 of Fig. 2, with the bulb being removed for clarity of representation; and Fig. 6 is a sectional view taken substantially along the line 6—6 of Fig. 5.

In Fig. 1 of the drawings, the lamp assembly embodying the invention is exemplarily shown to be applied to illuminate the rear license plate 10 of an automobile. Two lamp assemblies 12 are provided, one being mounted in each of a pair of bumper extensions or bumperettes 14, those bumperettes extending vertically and the lamp assemblies 12 being mounted therein so as to direct light rays laterally of the car. Since the two lamp assemblies 12 are mounted on adjacent sides of the bumperettes 14, the license plate 10 is conjointly illuminated by the two lamps.

While some form of license-plate illumination is not only desirable but also is required by law in many jurisdictions, it is equally undesirable that direct rays of white light emanate rearwardly from the automobile. As a consequence, the rear portions of the normally transparent or translucent lenses of the lamp assemblies 12 may be either made opaque or appropriately colored, to serve as danger or running lights, in a manner hereinafter to be described.

As may best be seen in the cut-away portion of Fig. 1, a wire 16 extends from each of the lamp assemblies 12 and is connected through suitable switching means to an appropriate source of electrical power in the automobile.

The lamp assembly, as shown in sectional elevational view in Fig. 2 of the drawing, comprises a body 18 having three coaxial cylindrical portions 20, 22 and 24. The first of these cylindrical portions 20 is provided with an apertured end cap 26 through which an insulated conductor 16 extends. Body portion 20 is also provided with suitable threads (not shown) or apertures 27 to accept either a screw-base lamp or, as shown, a lamp 28 having a bayonet base including bayonet studs 30.

The insulated conductor 16 terminates in a contact element 32 engaging a washer 34 of some suitable insulating material such as fiber. The fiber washer 34 is biased forwardly by means of a spring 36, seated within the body portion 20, so as to force the contact 32 into engagement with the base of the lamp 28. The sides of the base of the lamp 28 intimately engage the inner surface of the body portion 20 so as to establish electrical contact therewith in the customary fashion so that an electrical circuit may be completed through the conductor 16, through the lamp and to the other side of the source of electrical power through the body 18.

The second body portion 22 is also preferably in the form of a circular cylinder but is of substantial greater diameter than the first body portion 20. The first body portion 20 and the second body portion 22 are joined together by means of a flange 38 which is in the form of a vertically disposed apertured disc or annulus.

The third body portion 24 is also preferably in the form of a circular cylinder having a diameter slightly greater than the diameter of the second body portion 22, the two portions 22 and 24 being interjoined by an annular flange 40. It will be recognized that the body portions 20, 22 and 24, the flanges 38 and 40 and the end cap 26 are desirably formed integrally rather than being rendered integral after individual formation, the entire body 18 being preferably drawn or otherwise formed from a single piece of sheet metal, or cast as a unit.

The lens 42, through which the rays from the lamp 28 pass, is preferably a laminated plastic substantially hemispherical surface as shown. The rearmost portion of the lens 42 is so molded or otherwise formed as to provide an annular surface 44, a semicircular circumferential indentation 46, and an annular surface 48.

The annular surface 44 of the lens 42 is adapted to engage the front edge, and hence an annular surface, of the third body portion 24. The lens 42 is retained in this position by means of a grommet 50 which is preferably made of rubber or other appropriate flexible plastic material. The grommet 50 is primarily in the form of a circular cylinder, but is provided with an annular projection or enlargement 52 at the forwardmost end thereof, the inner surface of that annular projection 52 preferably being semicircular in cross section to mate with the semicircular circumferential indentation 46 in the lens 42, although it is to be understood that any other appropriate mating form may be employed. It will be seen that the grommet 50 lies between the body portion 22 and the lens 42 and serves to retain the lens 42 in position upon the body 18.

The grommet 50 is also provided with a projection 54 extending downwardly and then forwardly from the rear thereof, i.e., the grommet 50 is essentially folded inwardly upon itself to provide an extension 54 terminating in an annular surface engaging the annular surface 48 of the lens 42.

The lamp assembly is adapted to be positioned within a mounting plate 56 which may be a surface of the bumperette 14 of Fig. 1, or any other similar surface. The mounting plate 56 is provided with a circular cut-out having an additional small rectangular cut-out at one point thereon for a purpose hereinafter to be noted. The diameter of the cut-out in the mounting plate 56 is preferably substantially the same as the outer diameter of the body portion 22 and should be less than the outer diameter of the body portion 24. As a consequence, when the lamp assembly is inserted through the aperture in the plate 56 to assume the position shown in Fig. 2 of the drawings, the inner surface of the aperture in the mounting plate 56, or at least a portion of that surface, engages the outer surface of the body portion 22, and the rear surface of the flange 40 engages the outer surface of the mounting plate 56 so as to prevent either lateral or rearward motion of the body 18 relative to the mounting plate 56.

Forward motion of the lamp assembly, once it has been inserted in the mounting plate 56, is inhibited by means of the grommet 50. As may be best seen in Fig. 5 of the drawings, which is a section taken along the line 5—5 of Fig. 2, and in Fig. 6, which is a sectional view taken along the line 6—6 of Fig. 5, the grommet 50 is provided at two points on its periphery, those points preferably being diametrically opposed, with projections 60 which, as may be best be seen in Fig. 6, extend angularly so as to have an enlarged portion intermediate their ends.

Each of the projections 60 extends through an aperture 61 (Figs. 5 and 6) in the body portion 22, the rear end of the projections 60 lying in a circle having the same diameter as the body portion 22, and the middle portion of the projections 60 lying in a circle having a diameter which is equal to or greater than the outside diameter of the body portion 24. The portion of the projections 60 between the rearmost end thereof and the point of greatest diameter is smoothly tapered to act as a camming surface during installation of the assembly, and the portion of the projections 60 between the point of greatest diameter and the enlarged projection 52 is preferably also smoothly tapered to facilitate removal of the assembly from the mounting plate 56.

When the lamp assembly is inserted in the mounting plate 56, sufficient force must be exerted to compress the projections 60 adequately to permit the assembly to pass through the aperture in the mounting plate 56. After the point of greatest diameter of the projections 60 has passed through that aperture, the lamp assembly will snap into place, with the outer face of the mounting plate 56 firmly abutting the inner surface of the flange 40, with the inner edge of the aperture in the mounting plate 56 engaging the outer surface of the body portion 22 at least throughout a portion of the circumference of the body portion 22, and with the projections 60 engaging the rear face of the mounting plate 56 adjacent the aperture therein. The projections 60 will actually remain substantially deformed, as shown in Fig. 6, so that a constant but resilient force is exerted to maintain the lamp assembly in position.

In this fashion, the grommet 50 serves not only to retain the lens 42 upon the body 18 but also functions to retain the body 18, and hence the lens 42, in position on the mounting plate 56.

As was before stated, the lens 42 may be medially divided to provide one transparent or translucent portion through which white light may pass, and to provide a second portion which may either be opaque or of colored transparent or translucent material, as may best be seen in Fig. 3 of the drawings. It has been found to be desirable to form the lens 42 in two sections, so that the two portions of different light transmitting characteristics may be separately manufactured by casting or other similar operations.

In order to insure that the two portions remain rigidly together and that the junction of the two portions constitutes a moisture- and dust-tight seal, a mating tongue-and-groove arrangement is preferably provided as is shown in the sectional view of Fig. 4 of the drawings, in which one of the two portions of the lens 42 is shown to be provided with a projection 62 mating with a corresponding indentation 64 in the other portion of the lens 42.

Since the two halves of the lens have different light transmitting characteristics, means may be provided for insuring correct orientation of the lens 42 relative to the mounting 56 and hence relative to the vehicle or other instrumentality to which the lamp assembly is being applied. This is accomplished by insuring correct orientation of the lens 42 with respect to the grommet 50 and by insuring correct orientation of the body 18 with respect to the mounting plate 56.

As was before noted, the enlarged projection 52 of the grommet 50 was suitably formed to engage the circumferential indentation 46 in the lens 42. Orientation of these two elements may be achieved by providing a discontinuity in these two mating surfaces. Thus, the circumferential indentation 46 may be provided with a portion 68 adapted to engage a corresponding cut-out portion of the enlarged projection 52, as may be seen at the bottom of Fig. 2 of the drawing. The grommet 50 may be precisely oriented with respect to the body 18 by making the two projections 60 thereon of different size and the apertures in the body portion 22 appropriately different in size. However, even with the projections 60 and the mating apertures in the body portion 22 being of identical size, the grommet 50 can only occupy one of two positions with respect to the body 18 and the remaining functional orientation can be readily accomplished by the installer.

The body 18 is oriented with respect to the mounting plate 56 by providing at one point on the outer circumference of the body portion 22 a projection or key 70 (Fig. 5) engaging the aforesaid additional rectangular cut-out in the mounting plate 56. In this fashion the body 18 is oriented with respect to the mounting plate 56, the grommet 50 is oriented with respect to the body 18, and the lens 42 is oriented with respect to the grommet 50.

By virtue of the employment of the flexible grommet 50 a moisture and dust seal exists between the lens 42 and the lamp 28. Ingress of dust or moisture through the apertures 27 in the body portion 20 or the aperture in the end cap 26 may be prevented by the provision of a suitable boot 72 (Fig. 2) tightly engaging the body 18 and the insulating material on the conductor 16.

By virtue of the above-described arrangement, a lamp assembly is provided in which the elements thereof are simple of manufacture and may be readily interassembled. The lamp assembly is rapidly and easily associable with the mounting plate and yet will remain in position despite substantial shocks and jars. In the event that replacement of the lamp 28 is required, the entire lamp assembly can be readily removed from the mounting plate 56, by virtue of the camming action of the edge of the aperture in plate 56 upon the projection 60, the lamp assembly can then be readily separated, the lamp 28 replaced, and the elements reassembled and inserted in the mounting plate.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a lamp assembly, a body comprising first, second and third coaxial cylindrical portions, a first flange interconnecting said first and said second portions, and a second flange interconnecting said second and said third portions, said second portion having an aperture therein, one edge of said third portion defining an annular surface, a lens having a circumferential indentation and first and second annular surfaces coaxial one with the other, the first annular surface of said lens engaging the annular surface of said third portion, a flexible grommet abutting said first flange and said second portion, an enlarged annular projection at one end of said grommet engaging the circumferential indentation in said lens, an annular surface on said grommet abutting the second annular surface of said lens, and an additional projection on said grommet extending through the aperture in said second portion and lying in spaced proximity to said second flange.

2. In a lamp assembly, a hollow body comprising two coaxial cylindrical portions and a flange interconnecting said portions, the first of said portions having an aperture therein, a flexible grommet seated in said first portion, a radial projection on said grommet extending through the aperture in said first portion and lying in spaced proximity to said flange, a lens having a circumferential indentation therein, and an annular projection on said grommet engaging the circumferential indentation in said lens.

3. In a lamp assembly, a hollow metallic body portion adapted to engage an aperture in a mounting plate and having a forward face portion, a lamp having a base detachably secured within said hollow body portion and having a terminal portion in electrical engagement with said hollow body portion, electrical contact means within said hollow body portion and insulated therefrom and engageable with another terminal portion of said lamp, a lens mounted forwardly of said body and having a rearward face portion abutting said forward face portion, a peripheral shoulder on said lens having a forward face portion, a flexible grommet seated within said body portion, and a peripheral projection on said grommet engaging said lens and having a rearward face portion engaging said forward face portion of said peripheral shoulder for exerting rearward forces on said lens to secure said lens to said body portion.

4. In a lamp assembly, a hollow metallic body portion adapted to engage an aperture in a mounting plate, a lamp having a base detachably secured within said hollow body portion and having a terminal portion in electrical engagement with said hollow body portion, electrical contact means within said hollow body portion and insulated therefrom and engageable with another terminal portion of said lamp, a lens mounted forwardly of said body and having a rear face surface and a peripheral shoulder including a forward face portion, both said rear face surface and said peripheral shoulder lying within said hollow body portion, a flexible grommet seated within and engaging said body portion, an enlarged peripheral projection at the forward end of said grommet engaging said lens and having a rearward face portion engaging said forward face portion of said peripheral shoulder on said lens for exerting rearward forces on said lens to secure said lens to said body portion, and a forward surface on said grommet abutting said rear face surface of said lens.

5. In a lamp assembly, a hollow body portion including a socket portion adapted to accept a lamp, a lens mounted forwardly of said body and having first and second rearward annular surfaces and a forward annular surface coaxial one with the other, a forward annular surface on said body portion engaging the first rearward annular surface on said lens, a flexible grommet seated within and engaging said body portion, an enlarged annular projection at the forward end of said grommet having a rearward face portion engaging said forward annular surface on said lens for exerting rearward forces on said lens to secure said lens to said body portion, and a forward surface on said grommet abutting the second rearward annular surface of said lens.

6. In a lamp assembly including a lamp, the combination of a body portion, a circular, convex lens diametrically divided into a first convex lens portion and a second convex lens portion engaging said first convex lens portion along a generally semicircular arc, said lens portions concurrently transmitting light from the lamp, means interlocking said lens portions along the entire area of engagement of said lens portions, and means affixing said lens portions to said body portion and exerting radial forces on said lens to force said lens portions into abutment with one another.

7. In a lamp assembly including a lamp, the combination of a body portion, a circular, convex lens diametrically divided into a first convex lens portion and a second convex lens portion, said lens portions concurrently transmitting light from the lamp, means interlocking said lens portions comprising a projection along the length of one edge of one of said lens portions engaging a slot along the length of one edge of the other of said lens portions, and means affixing said lens portions to said body portion comprising a flexible grommet engaging said body portion and both of said lens portions and exerting radial forces on said lens to force said lens portions into abutment with one another.

References Cited in the file of this patent

UNITED STATES PATENTS

| | | |
|---|---|---|
| 1,528,332 | Hemmeter et al. | Mar. 3, 1925 |
| 1,561,415 | Dresner | Nov. 10, 1925 |
| 1,592,561 | Godley | July 13, 1926 |
| 2,114,350 | Lee | Apr. 19, 1938 |
| 2,165,835 | Brady et al. | July 11, 1939 |
| 2,202,315 | Langdon | May 28, 1940 |
| 2,208,155 | Daehler | July 16, 1940 |
| 2,263,061 | Allen | Nov. 18, 1941 |
| 2,446,455 | Bowman | Aug. 3, 1948 |
| 2,610,012 | Mackey et al. | Sept. 9, 1952 |
| 2,685,639 | Wiley | Aug. 3, 1954 |
| 2,687,862 | Crowther | Aug. 31, 1954 |